United States Patent [19]

Rickey

[11] 3,771,409

[45] Nov. 13, 1973

[54] MUSIC TEACHING DEVICE WITH A COLOR COORDINATED FINGERBOARD REGION AND COLOR CORRELATED FINGERBOARD REGION AND COLOR CORRELATED FINGERBOARD AND NOTATION REGIONS

[76] Inventor: James C. Rickey, 14634 S.E. 21st St., Bellevue, Wash. 98004

[22] Filed: Dec. 30, 1970

[21] Appl. No.: 102,860

Related U.S. Application Data

[62] Division of Ser. No. 750,057, Aug. 5, 1968, Pat. No. 3,554,074.

[52] U.S. Cl. .................................................. 84/471
[51] Int. Cl. .......................................... G09b 15/02
[58] Field of Search ...................... 84/470, 471, 477, 84/485

[56] References Cited
UNITED STATES PATENTS

| 1,300,193 | 4/1919 | Raff ...................................... 84/485 |
| 1,821,516 | 9/1931 | Hohn .................................... 84/485 |
| 3,338,126 | 8/1967 | Wiley et al ............................ 84/485 |
| 3,403,590 | 10/1968 | Quinton ................................ 84/470 |
| 3,218,904 | 11/1965 | Hartman ............................... 84/485 |
| 3,554,074 | 1/1971 | Rickey .................................. 84/485 |

FOREIGN PATENTS OR APPLICATIONS 9,641    1900    Great Britain ........................ 84/485

Primary Examiner—Richard B. Wilkinson
Assistant Examiner—Lawrence R. Franklin
Attorney—John O. Graybeal et al.

[57] ABSTRACT

An information display type music teaching device having a fingering location indicating region such as a simulated violin fingerboard displaying the names of the tones and the proper fingering thereof, said teaching device further having a graphic notation region aligned with a musical staff drawn through the key signature region, the fingering and notation in the graphic notation region having a color code and being color correlated to visually assist the student in following the fingering and moving from one region to the other. The fingering location region typically shows the tone names on a simulated violin fingerboard with half step spacing from the nut on each string and, in addition to the tone names, also shows the fingering adjacent to the tone names for a variety of Major Scales and fingering Positions correlated with the key signature region and the graphic notation region.

5 Claims, 11 Drawing Figures

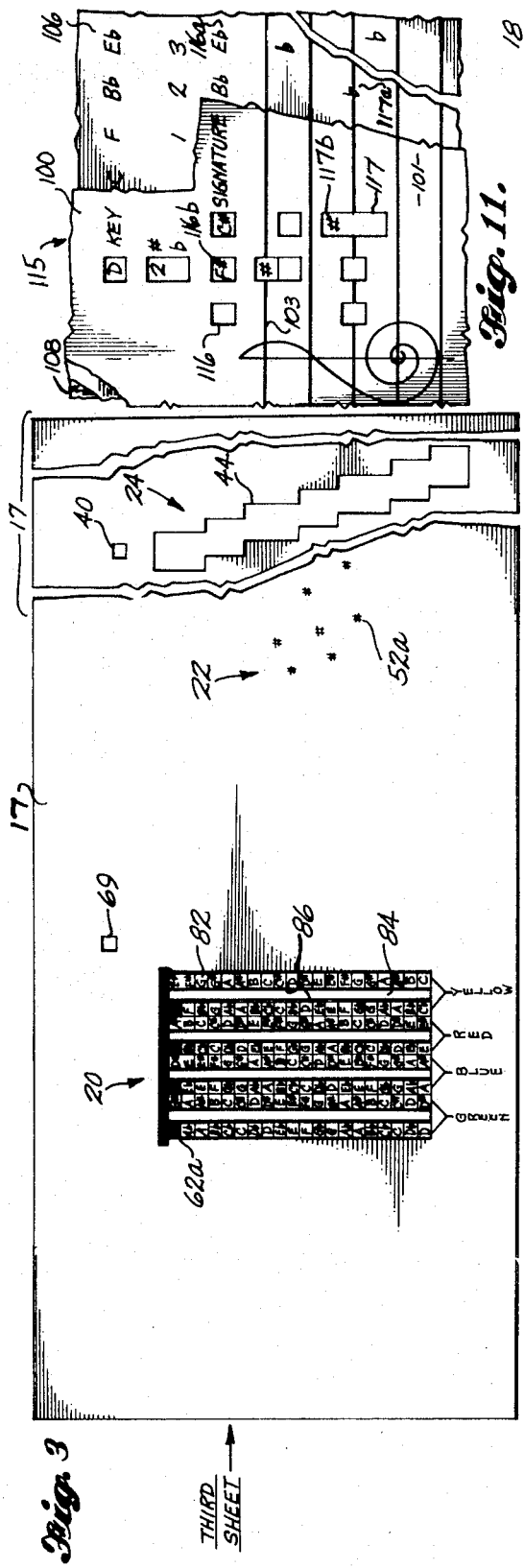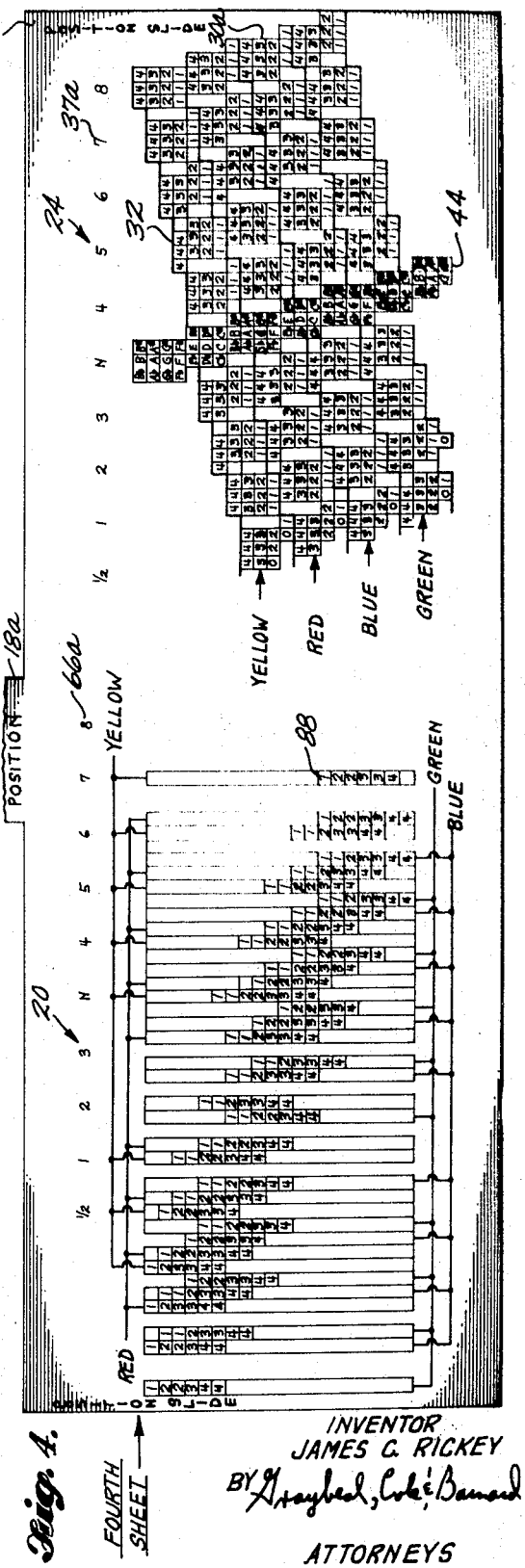

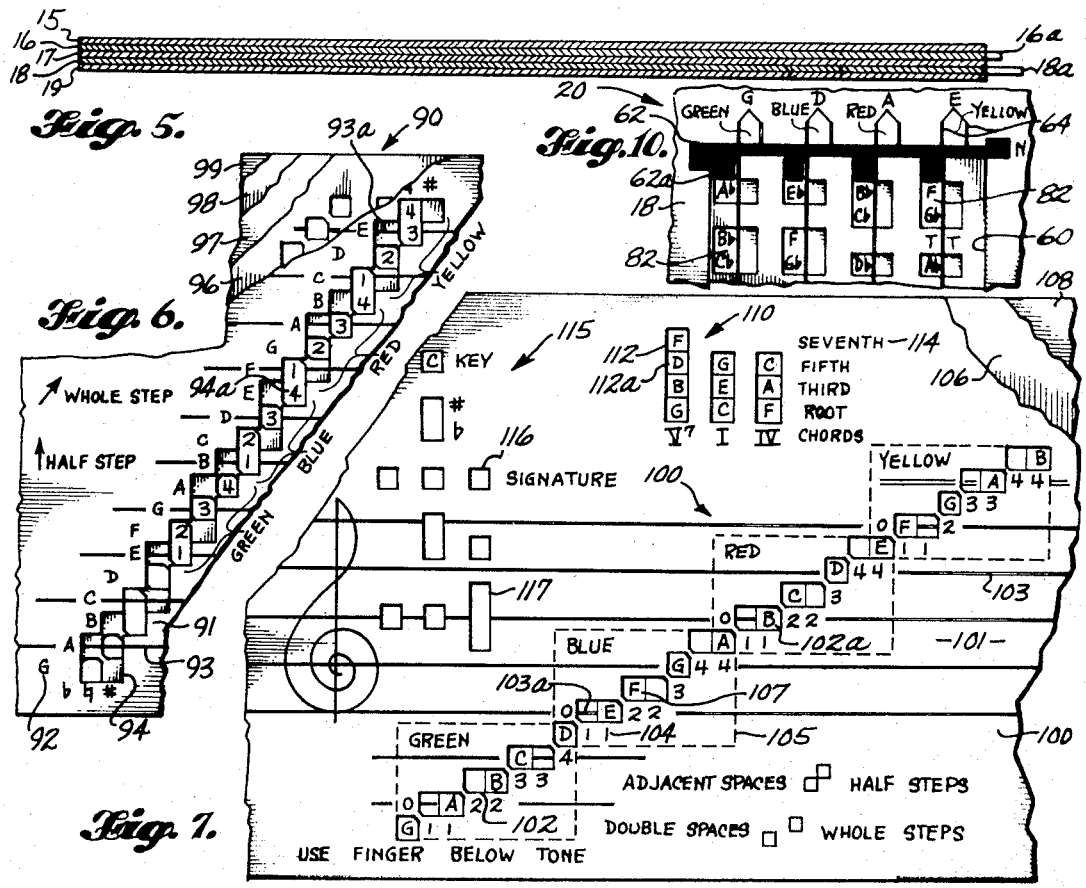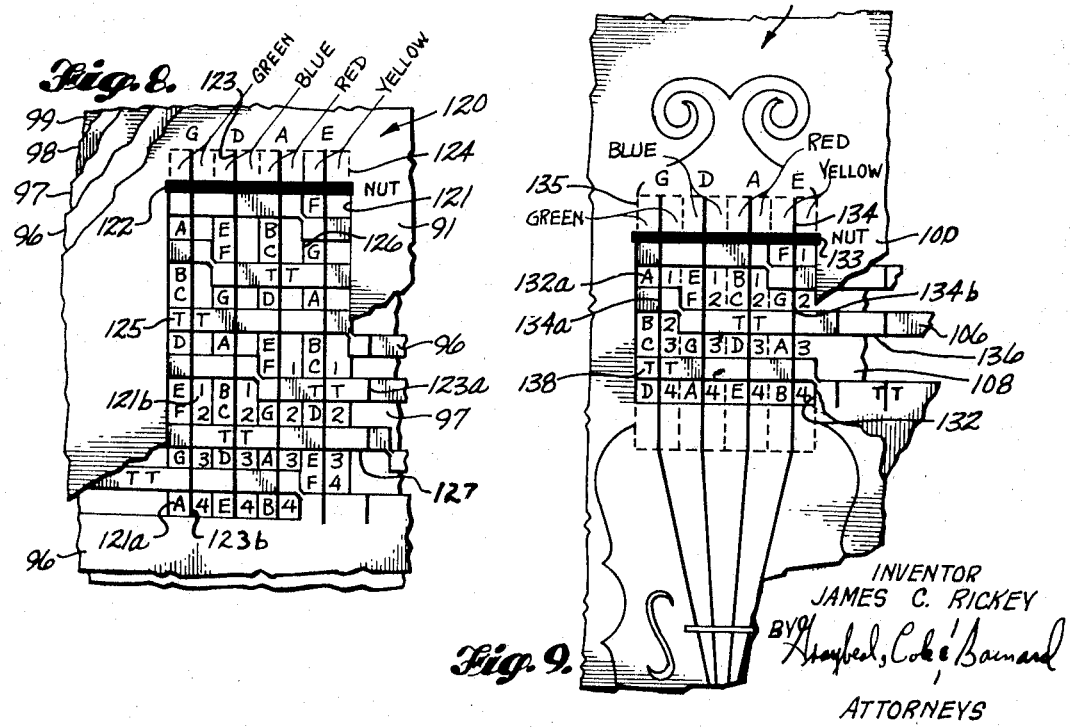

MUSIC TEACHING DEVICE WITH A COLOR COORDINATED FINGERBOARD REGION AND COLOR CORRELATED FINGERBOARD REGION AND COLOR CORRELATED FINGERBOARD AND NOTATION REGIONS

RELATED APPLICATION

This application is a division of my copending application Ser. No. 750,057, entitled Stringed Instrument Music Teaching Device, and filed Aug. 5, 1968, which issued as U.S. Pat. No. 3,554,074 on Jan. 12, 1971.

BACKGROUND OF THE INVENTION

1. Field of the Invention

This invention related to music teaching devices and more particularly to devices for assisting in the instruction, from the beginning student to the advanced artist, of stringed instruments, such as the violin.

2. Description of the Prior Art

Heretofore numerous instruction devices have been available to assist a beginning student in music and, more particularly, the violin. In general these devices have not presented a complete, easily understood visual aid for the student but rather have required the student to have a well grounded knowledge of the violin or considerable experience with the visual aid.

Perhaps one of the best devices in this field is the slide shown in Wickersham U.S. Pat. No. 605,157. Since this patent, which issued in 1898, few if any constructive improvements have been developed to aid the stringed instruments learning process. Even in the Wickersham patent, however, the student is presumed to have a solid musical background since only limited information is available and the information that is presented requires substantial reorganization by the student before it may be applied to instruction on the violin. For example, in the fingerboard region of the Wickersham device the student must guess at the fingering for the single Position shown and receives no assistance for fingering with respect to the distance from the nut of the violin for other Positions. While the Key Signatures are illustrated the sharp Key Signature appears on the reverse side of the slide card requiring removal and reinsertion of the card which renders it somewhat cumbersome and highly susceptible to wear. In the notation region of the device the notes for only a single Position are shown and there is no indication from the notation itself as to whether it is an altered note, that is, sharped or flatted, or whether the notes are separated by whole steps, half steps, or any other interval. While an attempt has been made in the patent to correlate the simulated strings on the fingerboard region with the notation region by dotted lines, such an approach is completely inadequate for a multiposition violin teaching device. It is deficient for even a single Position as the approach used in the patent does not present an adequate indication to which string the notation corresponds.

Another device of interest is shown in Kiehl French Pat. No. 1,181,237. This device uses only two sheets or planes and thus the information must be spread out and it becomes too bulky to bb carried in a violin case where it would be readily accessible for instruction. In addition, the use of the slide requires considerable correlation and cross referencing between the various charts to present a comprehesive picture. In particular, the key signature chart is confusing since it is not presented directly to the left of the notation chart as the student is accustomed to seeing it on sheet music. The notes are not named on the notation chart and there is no indication whether they are whole steps, half steps, natural, or altered. Likewise, the tones are lacking from the fingerboard region and, although several positions may be displayed, the fingering is not shown on a simulated violin fingerboard and thus does not show the exact location of the fingering with respect to the distance from the nut of the violin fingerboard. In essence, while such a chart may be of some assistance to the experienced artist, it tends to confuse rather than to assist the novice student.

SUMMARY OF THE INVENTION

This invention is primarily intended to present substantially all of the information a beginning student needs in order to learn to play and all the information an experienced artist should have to assist in playing stringed instruments, such as the violin. The information is presented in a concise, easily recognized and easily understood manner. The principle of multiple levels is combined with an arrangement of the indicia that visually and in a meaningful manner presents the information required to learn music notation and the instrument. Each of the fingerboard and graphic notation regions of the chart is uniquely color coordinated with the other region so that they correlatively and visually relate notation and fingering.

The notation region may itself be a separate chart available for the general instruction of music. One of the primary concepts of the notation region is to graphically display notation indicia from a lower plane on the staff of an upper plane in a manner that indicates the musical interval between adjacent notes. In the forms shown the interval is a whole or half step but this graphic concept is applicable to other intervals which comprise chords. The graphic representation is accomplished by the location on the chart of each successive note on the scale with respect to the preceding note.

Another graphic aspect of the notation region is that the location on the chart of the indicated note visually indicates whether it is an altered or a natural note. That is, the location of one set of the indicia, such as fingering shown in the display zones of the notation region, with respect to the other set of indicia on the first information sheet will immediately reveal whether the particular note is sharped, flatted or is natural.

Still another feature of primary importance in the notation region is the use of multiple layers or sheets having window forming portions such that when properly aligned beneath one another a display zone or notation window is formed through which appears the desired information indicia. The window forming portions may be openings in the top sheet with properly aligned indicia in a lower sheet but in the preferred forms shown the windows are formed by the alignment of sets of window forming portions in the top and lower sheets with the indicia being on a still lower sheet and appearing through the windows thus formed. In this manner a large range of variations may be accommodated in an extremely concise manner with the effect that the notation for various Keys and Positions may be indicated while graphically displaying the information in a manner to indicate whether the note is altered or whether successive notes are related according to a particular interval, such as, a whole or half step.

The key signature region also employs the concept of window forming portions on multiple sheets of a chart such that the Key Signature, whether it be flat or sharp, appears substantially as it would on a sheet of music. The Key signature region employs a concept of reiteration on one form of chart and on another form of chart a concept of masking on multiple planes to indicate the progressive display of the key signature indicia on the staff.

The key signature region and notation region are together arranged uniquely in alignment with one anothe on a common musical staff to present a comprehensive and complete visual learning aid showing the location and names of the various notes in a manner similar to the way they would appear on sheet music.

The fingerboard region also employs the concept of window forming portions on multiple sheets to basically indicate the tones corresponding to locations along the strings of a stringed instrument, such as a violin, with the locations being based on the distances from the nut of a simulated fingerboard. Also the fingering to obtain the various tones is indicated adjacent to the names of the tones and thus are also spaced from the nut for the various finger Positions used when playing the violin.

According to the present invention the simulated fingerboard is further readily understandable by the use of vertical heavy string indicating lines and a color scheme coordinated with the notation region. In one form of the invention a unique adjustable nut is provided to accommodate a larger number of Positions and Keys. The color pattern is carried over into the notation region of the chart to correlate quickly and easily the tones and fingering on a simulated fingerboard to the names of the notes and their locations on an actual staff. The fingerboard region is to the extreme left of the combined teaching device for use in instruction and sheet music can be laid over and thus mask out the key signature and notation regions.

The chart can be used with all sheet music and is designed to be thin enough to be carried under the stringed instrument in its case and be thus available at all times for the use of the student.

BRIEF DESCRIPTION OF THE DRAWING

FIG. 3 is a reproduction of a third infomration fixed sheet that appears directly beneath the second information sheet of FIG. 2.

FIG. 4 is a reproduction of a fourth information slide sheet that is positioned directly beneath the third information sheet of FIG. 3.

FIG. 5 is a transverse section through the composite chart shown in FIG. 1 indicating the various levels or information sheets including a back sheet.

FIG. 6 is a fragmentary reproduction of a modified notation region portion of a composite chart used in combination with FIG. 8.

FIG. 7 is a fragmentary reproduction of still another modified form of chart showing modified key signature and notation regions of a composite chart used in combination with FIG. 9.

FIG. 8 is a fragmentary reproduction of a modified fingerboard region of a composite chart used in combination with FIG. 6.

FIG. 9 is a fragmentary reproduction of still another modified form of fingerboard region of a composite chart used in combination with FIG. 7.

FIG. 10 is a reproduction of a fragmentary portion of the fingerboard region shown in FIG. 1 showing specifically the adjustable nut of that form of fingerboard.

FIG. 11 is a reproduction of the same chart as in FIG. 7 but have sheets broken away to show the operation of the key signature region.

Figure 1:
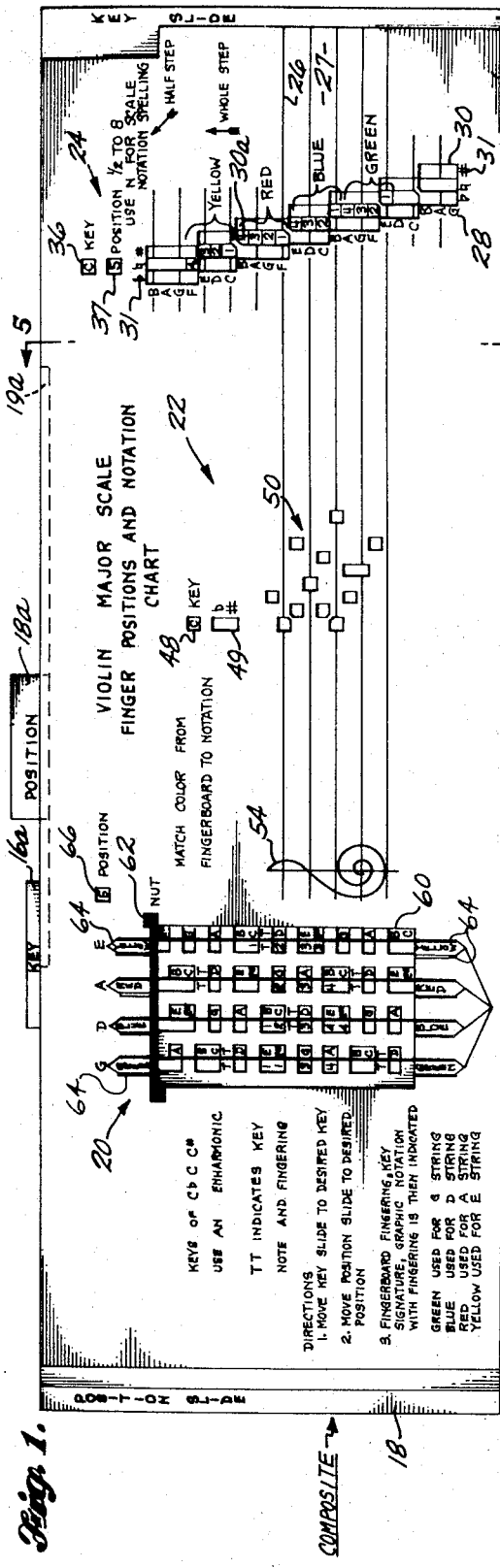
FIG. 1 is an illustration of a complete composite chart according to the invention, with the chart presented in its most complete form, showing all regions combined, and showing the position slide and key slide arranged with the indicia for the Fifth Position in the Key of C being displayed.
Figure 2:
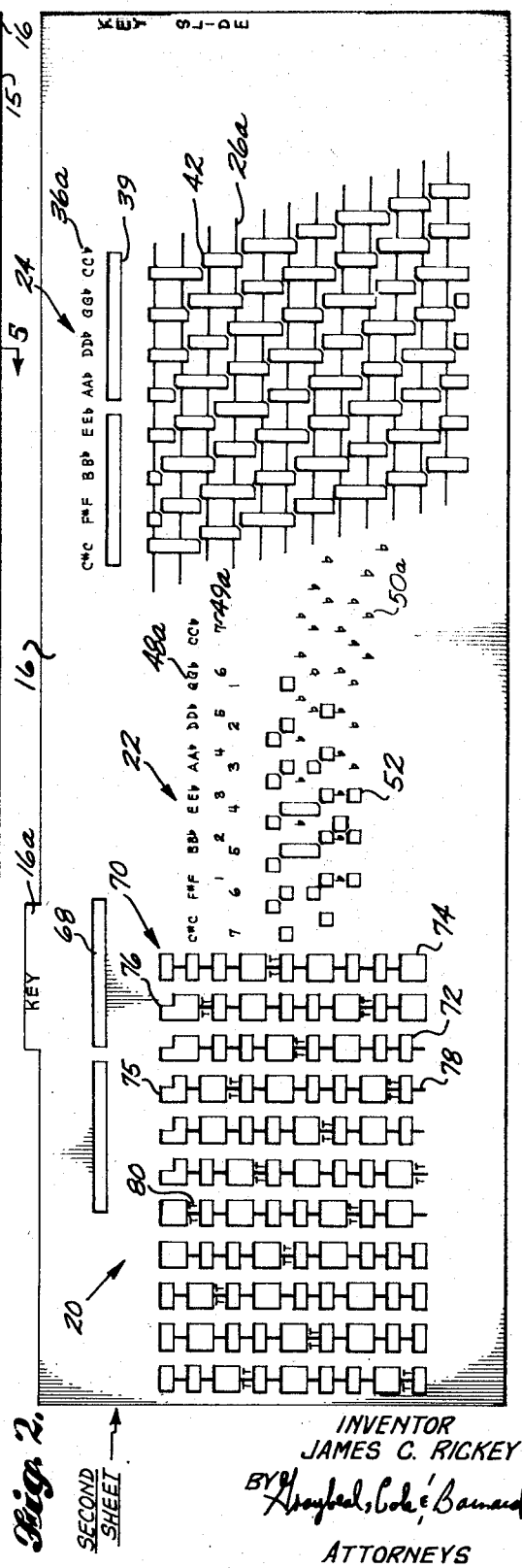
FIG. 2 is a reproduction of a second information slide sheet which appears just below the top or first information sheet shown in FIG. 1.

As best shown in FIGS. 1 and 5 the composite chart structurally is in the form of several fixed planes or layers and two slide planes. The structure may be varied, however, to accommodate less planes as described herein and may be constructed according to modern techniques employed with this sort of device. Plastic, heavy paper, or other materials may be used as desired. As shown, a first information sheet 15 forms the top level of the chart. The second level is a slidable sheet and is identified herein as a second information sheet 16 (FIG. 2). A key tab 16a extends outwardly for moving the sheet. A third information sheet 17 (FIG. 3) is, in the form shown in FIG. 1, attached to the first information sheet and thus is a fixed information sheet. A fourth information sheet 18 (FIG. 4) is a slidable information sheet in the form shown in FIG. 1 and is separated from the second information sheet by the fixed third information sheet 17. A position tab 18a extends outwardly from the fourth information sheet 18 for moving the sheet. A bottom or back sheet 19 (FIG. 5) is attached to the third information sheet 17 and is used merely to form a frame for the slidable fourth information sheet 18. A slot 19a (FIG. 1) is provided for allowing the outward protrusion of the position tab 18a.

It is to be noted that the chart chosen for illustration in FIGS. 1–5 and 10 is the most complete chart constructed according to the principles of the invention but more basic charts may be constructed with lesser sheets to provide less comprehensive information. These less complete charts are intended for the beginning and intermediate students respectively since it is common knowledge that the beginning student may spend several years working in a single fingering Position on the violin and will not have need for the more complete information available on the form illustrated. The principles involved, however, in constructing the more basic charts are the same or modifications of those to be described with reference to the more complete chart with the details of only one being thoroughly described. It is understood that the arrangement of fixed and slidable sheets may be varied and that various other forms with more or less degree of completeness may be constructed from the principles herein disclosed. It should also be noted that meaningful separate charts containing only certain of the regions may be constructed in order to assist in teaching other instruments or music notation in general and that other independent or composite charts may be constructed using the principles of the invention for teaching other musical instruments. The invention will be described, however, with reference to stringed instruments and even more particularly to a violin.

Referring now to the chart shown in FIGS. 1–5 and 10, the chart is divided into a fingerboard region 20, a key signature region 22, and a graphic notation region 24. As is readily apparent the regions do not shift but the indicia presented at the regions may be varied by sliding the key slide (second information sheet 16) or the position slide (fourth information sheet 18).

GRAPHIC NOTATION REGION

The notation region 24 is first described since it is applicable to teaching music notation generally as well as being used in conjunction with a teaching device for the violin. As seen on the first information sheet 15 the notation region includes the lines 26 and spaces 27 of a musical staff. Positioned on the lines and spaces are treble clef indicia 28. As will be later described the clef indicia need not be on the first information sheet but rather notes may appear in modified forms of the invention on lower information sheets. Adjacent to the notes and to the right thereof are openings or window forming portions 30. Each of the window forming portions on the first information sheet 15 contains a number of equally-sized spaces or display zones transversely and longitudinaly of the sheet. For example, three spaces are arranged longitudinally in each notation window with each space corresponding to a natural note or an altered, that is, flat note or sharp note, as indicated by the symbols 31 at the top and bottom of the window forming portions. The number of spaces transversely in each window forming portion of sheet 15 varies, being either three spaces, as for example indicating the clef indicia C, D, E, or four spaces, for example indicating the clef indicia F, G, A, B. The window forming portions are aligned generally along a line that is sloped at an acute angle upwardly and to the left of the sheet. The customary appearance of notation on sheet music is upward and to the right at an acute angle, however, in this form of chart the angularity was deviated from the customary to reduce the overall length of the chart.

As an example of how the spacing of the display zones within the notation window forming portions 30 graphically displays whether a note is natural or altered, it can be seen in FIG. 1 that number indicia 30a, which correspond to the Fifth Position fingering on a violin, are for the Key of C, which has no altered notes, each spaced longitudinally in the center of the window forming portions 30 for each note displayed. If one of the notes were to be flatted, that is, lowered, the fingering number 30a for that note would appear in the display zone or space adjacent the edge of the window forming portion closest to the named clef indicia 28. If the note were sharped the fingering number would appear in the space at the edge of the windor forming portion 30 farthest to the right or farthest remote from the clef indicia 28. As an example of the graphic representation of intervals the step intervals between the successive notes corresponding to the fingering numbers 30a are in FIG. 1 between the lowermost fingering number "1" and the next higher successive finger number "2" (a half step interval); between the "2" and the next successive fingering number "3" (a whole step); between the "3" and the next number "4" (another whole step); between the "4" and the next successive number "1" (another whole step); between the "1" and the next successive number "2" (a half step interval); etc. throughout the scale. This corresponds to the intervals in the scale of the Key of C wherein the interval between E and F is a half step; F and G, G and A, and A and B are whole steps; and, between B and C is again a half step. The student immediately upon seeing the arrangement of this indicia, in this case fingering 30a, realizes that a half step is represented between those notes angularly related to one another whereas those notes directly transverse or above one another are whole steps. As is shown hereinbelow with reference to modified forms of the invention the particular arrangement of the graphic notation may be varied and the fingering and notes even reversed on the respective sheets.

The notation region 24 is also provided with a key name window 36 and a position window 37 to indicate the musical Key and fingering Position for which the chart is indexed.

The interrelationship of the remaining information sheets with respect to the notation region 24 will now be described. In FIG. 2 the second information sheet 16 or key slide includes a longitudinal row of key name indicia 36a and two longitudinal position slots 39. As is readily apparent the key name indicia 36a and the position slots 39 are registrable respectively with the key name window 36 and the position window 37 of the first information sheet 15. The information regarding Key name for the notation region thus ends on the second information sheet. The information relating to Position, however, continues to the third information sheet 17 (FIG. 3) wherein a window 40 is provided, and to the fourth information sheet 18 (FIG. 4) wherein a longitudinal row of position indicia 37a are provided and are registrable with the window 40 and the position slots 39 to be displayed in the position window 37 of the first information sheet.

The second information sheet 16 also includes a plurality of notation window forming portions 42, and staff and ledger lines 26a which are continuations of the staff lines 26 of the first information sheet 15. The notation window forming portions 42 have a longitudinal width equal to a single display zone, as discussed above, and in the case of the chart shown in FIGS. 1–5 and 10 is equal to one-third of the longitudinal spacing of the window forming portions 30. Thus when the notation window forming portions 42 are registered with the notation window forming portions 30, the only indicia which may be displayed will be that appearing in the notation window forming portions 42 with all other indicia below the second information sheet 16 and otherwise registrable with the notation window forming portions 30 being masked.

The third information sheet 17 (FIG. 3) is provided with a staggered opening 44 which is identical to the outer shape of the window forming portions 30. The opening 44 functions only as an opening to allow visual access to the fourth information sheet 18 and need not have any particular configuration.

The fourth information sheet 18 (FIG. 4), which is the position slide, includes multiple patterns of fingering indicia or numbers 30a registrable in the notation window forming portions 30 of the first information sheet. The fingering indicia are laid out along paths or areas inclining upwardly to the right and as the finger positions are raised.

According to the present invention each fingering indicia shown is colored as indicated by boundary lines 32. For example, the color surrounding each fingering number 30a in the lowermost areas defined by the boundary lines 32 is green, the next higher is blue, the next red and the remainder yellow.

The areas defined by the boundary lines 32 are broken longitudinally centrally by columns of notation indicia 44 which visually show the notation or notes for any desired Key when the letter N from the row of position indicia 37a is displayed in the position window 37. The notation indicia on information sheet 18 are used to indicate the scale notation generally rather than for specific use with the violin. As an example of how the notation indicia 44 are used, assume the key slide 16 is moved to show the Key name C through the key name window 36, i.e., the chart is set for the Key of C, and the position slide 18 is moved to the right so that the notation letter N appears in the position window 37. The scale notation starting from the bottom of the scale and working up will thus be C, D, E, F, G, A, B. C and so on. The notation letters appear in the centermost display zones longitudinally of the window forming portion 30 to graphically indicate that the Key of C has only natural notes and appear with the notes E and F, B and C being diagonally disposed to graphically indicate their half-step relationship. By varying the key slide 16, that is, by moving the second information sheet 16 so that a different key name 36a appears in the key name window 36 the scale notation or notes will individually appear displayed either toward the right, toward the left or in the center of the notation window forming portions 30 depending on whether the note displayed in that Key is flatted or sharped or remains natural. As is readily apparent the notation may be obtained in this manner for any Key desired and will visually indicate whether a note is altered and whether it is a half or whole step interval form its next successive note.

The fingering numbers or indicia 30a of the fourth information sheet 18 are of course related to the fingering on a violin fingerboard although, as mentioned earlier, they could also represent the fingering on other instruments, such as on the valves of a horn or the strings of a banjo. As shown in FIG. 1 the fingering for the Fifth Position on the violin in the Key of C appears in the window forming portions 30. Starting from the lowermost fingering indicia 30a and working up it is understood that the first finger of the left hand when on the G string of the violin will produce a natural tone corresponding to the note E, the second finger the natural tone corresponding to the note F, the third finger the natural tone corresponding to the note G, and the fourth finger the natural tone corresponding to the note A. The first finger on the D string will produce the natural tone corresponding to the note B, the second finger will produce the natural tone corresponding to the note C and so on through the various fingers. The zeros in the fingering indicia 30a indicate the string is to be played without applying a finger so as to get the natural string tone. Thus although the fingering indicia of the notation region are related to an instrument it should still be kept in mind that the notation columns 44 will provide a complete notation chart for the general teaching of music.

KEY SIGNATURE REGION

The key signature region 22 is next described. As best shown in FIG. 1 the first information sheet 15 is provided with a key name window 48, a number window 49 and a clustered pattern of key signature window forming portions 50 that appear on the lines and spaces 26 and 27, respectively, of the musical staff of the first information sheet.

The key signature region 22 of the second information sheet 16 (FIG. 2) includes a longitudinal row of key name indicia 48a and two spaced longitudinal rows of numbers 49a registerable respectively in the number window 49 adjacent to either the flat or sharp symbol. A plurality of key signature indicia or symbols 50a, specifically flat symbols, are on the second information sheet 16 and are registerable with the key signature window forming portions 50 of the first information sheet 15 depending on the Key selected. For example, if the Key name A flat from the key name column 48a of the second information sheet 18 is displayed in the key name window 48, the number "4" of the upper column of numbers 49a appears in the number window 49 adjacent to the flat symbol. The key signature window forming portions 50 then displays four flat symbols 50a on the lines and spaces of the musical staff just as this Key Signature appears on a sheet of music. Also provided on the second information sheet 16 adjacent the flat symbols 50a are a pattern of window forming portions 52.

On the third information sheet 17 in the key signature region 22 a pattern of sharp symbols 52a are provided. When a Key is selected which contains sharps the window forming portions 52 of the second information sheet are in register with the window forming portions 50 of the first information sheet 15 and the sharp symbols 52a appear in the key signature windows thus formed. For example, if the Key name E from the key name indicia column 48a of the second information sheet 16 is aligned with the key name window 48 of the first information sheet the number "4" from the lower longitudinal column of numbers 49a appears in the number window 49 adjacent to the sharp symbol. The window forming portions 52 from the second information sheet 16 are in register with certain of the window forming portions 50 of the first information sheet and the sharp symbols 52a of the third information sheet 17 are displayed in a manner identical with that of a Key Signature on sheet music. This form of the key signature region is advantageous because the Key Signature is always presented at the same spacing from the treble clef sign 54 as is customary for sheet music and may accommodate any Key Signatures.

As is apparent in the chart shown in FIGS. 1–4 a "reiteration" principle is employed to present the Key Signature for the various Keys. On the second information sheet the flat symbols 50a and the window forming portions 52 for the sharp symbols are repeated in longitudinal alignment. Because of this reiteration or repetition the key slide 16 may be slid from the extreme left, which is for the Key of C flat and displaying seven flats in the key signature, to the right and through the various Keys until only one flat is displayed, i.e. the Key of F, the reiterated or repeated flats being masked out selectively to satisfy the requirements of the various key signatures. The sharp symbols 52a progressively increase in number displayed since the reiterated or repeated window forming portions 52 begin to progressively align themselves over the sharp symbols.

In a modification a "masking" principle is employed using a flat key signature which is progressively masked so that multiple flat key symbols are decreased as the slide is moved from left to right and the key symbol B flat is the last shown. The sharp signatures are shown with an opening displaying, first, F sharp and then progressively increasing sharp symbols are shown as the slide is moved from left to right and the openings uncover the additional sharp symbols. In addition, the flat or sharp key signature is spelled-out in this modification (described further with reference to FIG. 11).

KEY SIGNATURE AND GRAPHIC NOTATION COMBINATION

Another feature is the relationship between the key signature region 22 when used on the chart with the notation region 24. With the key signature region being to the left of the notation region, which is customary in music, and being on the same musical staff the student may readily see the note that is affected by the key signature and/or the exact finger with which this note will be played on a violin string.

FINGERBOARD REGION

The fingerboard region 20 is next described. The first information sheet 15 is provided with a large fingerboard framing opening 60. The upper edge of the opening is bounded by a heavy black bar or nut 62 simulating the nut of a fingerboard on a violin. Extending perpendicularly from the nut and spaced longitudinally therealong are sets of double heavy lines or strings 64 simulating the strings of an actual violin. The nut and remaining edges of the fingerboard framing opening 60 form window forming portions to operate in conjunction with other window form portions (to be described) and together therewith form display zones. The fingerboard region is primarily a tone name and finger indicating device; it indicates the tone produced when the string is bowed and a finger is applied along the string at the distance from the nut that the tone name appears. It is also a fingering device, however, in that the locations of the fingering for any Key or fingering Position is indicated. As the beginning student is generally confined to selected Keys in the First Position, a meaningful chart is presented showing various tones and fingering for the single Position. For the more advanced student selected Keys and several Positions may be shown whereas for the expert artist the most complete form of chart shown in FIGS. 1-4 and 10 shows tones and fingering form all common Positions and many Keys. In the complete chart (FIG. 1) a position window 66 is provided and a separate key name window (not shown) may also be provided similar to the key name window 48 of the key signature region 22.

On the second information sheet 16 in the fingerboard region 20 two elongated, longitudinally spaced position slots 68 are provided. These slots align with the position window 66 of the first information sheet and with a position window 69 in the third information sheet 17. As the third information sheet is fixed with respect to the first, the window 69 merely provides visual access to position indicia, to be described, on the fourth information sheet 18. On the fourth information sheet 18 a row of longitudinally spaced position indicia or numbers 66a including "N" for notation spelling are provided and as is apparent are registerable with the position window 66 of the first information sheet 15 depending on which Position is to be displayed.

The second information sheet 16 (FIG. 2) is also provided with fingerboard window forming portions 70 some of which are larger than others. Each window forming portion includes at least two longitudinally spaced display spaces or zones, such as indicated by the reference character 72 except in the nut indicated area. Some of the window forming portions 70 include four display zones, two longitudinally spaced and two transversely spaced as at 74; some include three spaces as at 75; and still others include five spaces as at 76. Between transversely adjacent window forming portions 70 are heavy, partial string lines 78 that continue the string indicating lines 64. Also provided between transversely adjacent window forming portions 70 but only at selected locations are tonic indicators 80, identified by the letters T. As is well known a tonic indicates the first and main note of a Key. For example, as viewed in FIG. 1, the tonic for each string is displayed just below tone C since the chart is set for the Key of C.

In the fingerboard region of the third information sheet 17 (FIG. 3) vertical rows of tone names or indicia 82 and elongated transverse slots 84 are provided. A heavy string indicating line 86 is drawn along each row of tone indicia and form continuations of the strings 64 of the first information sheet. The rows of tone indicia are of course fixed in relation to the fingerboard opening of the first information sheet, and thus fixed with respect to the string indicating lines 64, since the third information sheet is itself fixed. However, by shifting the second information sheet 16 to the right or to the left certain of the rows of tones are revealed at any one time. The string indicating lines 86 adjacent to the displayed rows of tones are aligned with string indicating lines 64 on the first information sheet. For example, as is indicated for the Key of C, the tones for the E string starting from the nut are E sharp (enharmonic for F), G, A, B and so on. It should also be noted that the tones appear aligned with the right-hand string indicating line 64 of the E string. If the key slide 16 is shifted to the Key of A the tones appear to the left of the left-hand string indicating line 64 for the E string.

Reiteratively, one of the important features of the fingerboard 20 is that the tones are shown in their proper spaced relation from the nut indicating line 62 to simulate the actual location of the tones on the strings of a violin. Constructing this feature into the most complete chart, as is shown in FIGS. 1-4 and 10, is more difficult because of the large variety of Keys and Positions. Thus in this more complete chart an adjustable nut is provided. The adjustable nut is indicated by black spaces 62a (FIG. 3) at the top of the rows of flat key tone indicia 82. The effect of the adjustable nut is best shown in FIG. 10, wherein the chart is set for the Key of G flat, and by comparing it with the chart displayed in FIG. 1, which is set for the Key of C. As shown in FIG. 1 the tone E sharp, for example, appears at the upper right-hand corner of the fingerboard opening 60 and is adjacent to the nut line 62a. However, in the Key of G flat (FIG. 10) the first tone in the First Position for the E string is F and to indicate that this tone is obtained on the string close to the nut, just as E sharp (enharmonic of F) for the Key of C, a nut indicating portion or heavy black space 62a from the third information sheet 17 is displayed. As thus formed the nut 62 may be considered merely as a thicker black bar and includes the black spaces 62a when displayed.

The fourth information sheet 18 (FIG. 4) is provided with rows of fingering numbers or indicia 88 which are selectively registerable with the elongated vertical slots 84 of the third information sheet 17 and the fingerboard window forming portions 70 of the second information sheet 16 and thus are displayed adjacent to one of the string indicating lines formed by the lines 64 of the first information sheet 15 and the continuation lines 86 of the third information sheet.

According to the invention each column of fingering indicia 88 of the fourth information sheet is colored as is indicated by the arrows and color names. In other words, the row farthest to the left is green, the next row over is blue, then red, then yellow and so on. Likewise, the rows of tone names 86 on the third information sheet 17 are also colored. For example, the row of tone names farthest to the left is green, th next blue, then red and so on as is indicated. These rows of coloring correspond with the strings of the first information sheet 15 wherein the area between the string indicating line 64 for the G string is green; for the D string, blue; for the A string, red; and finally for the E string, yellow. The purpose of the coloring is to visually direct the student's eye to the desired indicia since coloring is one of the most effective forms of discriminating between various sets of indicia. The coloring also correlates to the coloring on the garphic notation region 24 as earlier described.

As an example of how the fingerboard region 20 is used along as the teaching device we can begin with the chart set for the Key of C in the Fifth Position as is shown in FIG. 1. Viewing the fingerboard region 20 the student immediately sees the location from the nut 62 of the simulated violin fingerboard where the desired tones are. With this Key and Position the tone C is obtained on the E string of the violin when the finger is pressed eight half-step spaces down from the nut. The tone D appears at 10 half-step spaces from the nut. The tone E appears 12 half-step spaces from the nut, and the tone E sharp, which is the enharmonic for F, appears 13 half-step spaces from the nut. At this point it should be noted that the arrangement of indicia on the fingerboard region 20 uses enharmonics, that is, the relationship that an altered tone may be identical with a natural tone such as the relationship between E sharp and F. The enharmonics are used only in the fingerboard region of the chart form shown in FIGS. 1-4 and 10 and then only in the Keys of C flat, C, and C sharp as indicated on the first information sheet 15. Graphic notation indicated with the fingering will not indicate the enharmonics. To continue with the example, with the chart indicating the Key of C in the Fifth Position the fingering for this position is indicated in the display zones directly adjacent to the tone names. Thus, for the tone C on the E string, this tone is obtained in the Fifth Position by using the first finger; D is obtained by using the second finger; E, by using the third finger; and E sharp enharmonic, by using the third finger, but F, using the fourth finger, would be used in actual practice. The scale is then continued by moving to the A string where the tone G is obtained by using the second finger; A, by using the third finger; B, by using the fourth finger. To complete the octave it is necessary to shift to the D string and so on. According to the present invention each string is indicated by its particular color with the fingering and tone notation shaded with that color so that a solid color and a solid black string indicating line appears lengthwise along the fingerboard opening. To transpose this relationship to the graphic notation region 24 the student need only look for the color corresponding to the string in the fingerboard region and then can see graphically where the corresponding note appears on the musical scale and the corresponding finger to obtain the note. As will be evident, the various regions have an interrelationship to provide substantially all of the useful information needed by both the beginning student and the more advanced artist.

OTHER FORMS

Now turning to the modifications it should be understood that these modifications all adhere to the aforementioned principles differing only in the details and arrangement of the information. In FIG. 6 a fragmentary portion of a chart showing a modified graphic notation region 90 of a multisheet chart is shown. The top or first information sheet 91 includes staff spaces and lines 93 and note indicia 92 aligned with notation window forming portions 94. In each window forming portion there is either two display zones as, for example, adjacent the clef indicia B, or a single space as, for example, for the clef indicia D. The purpose of more than a single space longitudinally is to visually indicate whether a note is flat, natural or sharp. It is also noted that each clef indicia 92 is spaced either adjacent to the window forming portion or one space to the left of the window forming portion. For example, the clef indicia G, C, D and F are spaced from the window forming portions. The chart is set for the Key of C, Fifth Position and each of the indicia displayed in the window forming portions is two spaces to the right of the corresponding clef indicia. If a note were flat the indicia appearing in the window forming portion would be in the space adjacent the clef indicia and if the note were sharp the indicia appearing in the window forming portion would be three spaces to the right of its respective clef indicia. In this way, much in the same manner as was described for the embodiment of FIGS. 1-4 and 10, the student may visually observe how a note is altered and in which manner.

Each window forming portion 94 is also provided with multiple spacing vertically or transversely of the first information sheet 91. For example, starting from the lower left corner of the window forming portions 94 the vertical spacing is two spaces, three spaces, two spaces, three spaces and so on upward to the right-hand corner of the window forming portions. The vertical spacing provides a visual indication of half-step and whole-step intervals in a manner the reverse of that shown in the embodiment of FIGS. 1-4 and 10. For the Fifth Position in the Key of C starting from the top and working down from the left, the notes F and E are spaced a half-step, E to D is a whole step, D to C is a whole step and C to B is again a half-step and so on through the scale. Thus, the student may also visually ascertain the interval distance between successive notes on the scale.

Only a fragmentary plan of a composite slide is shown in FIG. 6, it being understood that in this modification there are besides the first information sheet 91, a second slidable information sheet 96, a third fixed information sheet 97, a fourth slidable information sheet 98, and a fifth sheet 99 whic serves primarily as part of the framework to hole the slidable sheets in place. The second information sheet 96 includes a plurality of window forming portions much the same as the window forming portions 42 of the embodiment shown in FIGS. 1-4 and 10 and also staff lines 93a alignable with the staff lines 93 on the first information sheet 91. The third information sheet 97 includes a fixed opening the same as the window forming portions 94 of the first information sheet 91 and serves merely as an opening for access to the indicia on a fourth information sheet 98. The fourth information sheet 98 is slidable and includes rows of fingering indicia each surrounded by a predetermined color corresponding to a string color on the fingerboard region shown, for example, in FIG. 8 of the modified form. The fingering indicia 94a are displayed in the window forming portions 94 as shown in FIG. 6. The fingering notation and its color code are basically similar to that shown in the embodiment shown in FIGS. 1-4 and 10 and thus are readily understood without further description.

A primary difference between the modified embodiment shown in FIG. 6 and the embodiment shown in FIGS. 1-4 and 10 is that the notation window forming portions 94 are inclined generally upwardly and to the right rather than upwardly and to the left as in the latter form. The inclination in the modified form of FIG. 6 is preferable as it more closely resembles the scale notation as it appears in sheet music and since less information is presented in the modified form there is less need for the space saving rearward inclination of the earlier form.

In the modification in FIGS. 7 and 11 a single slide is used. In this form a top or first information sheet 100 is provided with window forming portions 102, fingering indicia 104 adjacent to the window forming portions, and spaces 101 and lines 103 of a musical staff. The window forming portions are divided into four overlapping color areas, each indiciated by the dotted lines 105, and each shaded with a color as is indicated. This technique represents a slight variation from the two previously described embodiments in that the coloring area has been expanded to make the visual transition from the fingerboard region to the notation region easier. This embodiment is the simplest form of chart and is designed for a beginning student whose interest is limited to the First Position and a relatively few Keys. Therefore all of the fingering indicia shown is for the First Position.

Another distinction between the embodiment shown in FIGS. 7 and 11 and the two earlier described forms is that the latter embodiment does not use clef indicia. However, it still presents a graphic representation for visual indication of the whole and half-step intervals between successive notes. In this form of the invention this visual indication is accomplished by providing certain of the window forming portions 102 with double display zones or spaces longitudinally of the first information sheet 100. For example starting from the top of the scale and working downwardly to the left the window forming portion adjacent the fingering numbers "4—4" has two spaces longitudinally, the window forming portion above the fingering numbers "3—3" has two spaces, but the window forming portion above the fingering number "2" has only a single space. To visually observe whether successive notes are spaced a half or whole-step interval the notes in adjacent spaces are half-steps and where a space lies between two successive notes it indicates a whole-step. For example, as shown in FIG. 7 for the Key of C, starting from the lower left-hand corner of the scale the interval between G and A is a whole-step, between A and B a whole-step, but between B and C which are in adjacent spaces the interval is a half-step.

The second information slide sheet 106 in the form of FIG. 7 is similar to that of FIGS. 1-5 and 10. It is provided with window forming portions 107 and staff continuation lines 103a corresponding to the staff lines 103 on the top information sheet 100.

A third information sheet 108 is similar to that of FIGS. 1-5 and 10 and is fixed with respect to the first information sheet. In this basic form of chart the third information sheet is the last sheet in the chart. This sheet is provided with note indicia 102a displayed in the windows formed by the window forming portions 102 of the first information sheet 100 and the window forming portions 107 of the second information sheet 106.

The principle of "masking" is employed in the key signature region 115 of the chart shown in FIGS. 7 and 11 and is best described with reference to FIG. 11. The flats 117a on the second information sheet 106 are progressively masked whereas the sharps 117b on the third information sheet 108 are progressively displayed in increasing numbers as the key slide is moved from left to right. An additional feature is shown in the key signature region 115 of the chart of FIGS. 7 and 11, namely, th key signature "spelling" is shown. To this end, key signature spelling windows 116 are provided in the first information sheet 100. On the second information sheet 106 spelling indicia 116a for flats and additional spelling windows, not shown, for displaying sharps are provided. On the third information sheet 108 spelling indicia 116b for sharps are provided. An understanding of the spelling principles of the chart shown in FIGS. 7 and 11 may be readily understood by positioning the chart in the Key of D, as shown in FIG. 11. In this position two sharp symbols appear in the key signature window forming portions 117. In addition the characters F , C (116b) also appear in the spelling window 116. In other words the spelling names the scale indicia shown by the symbols (two sharps for the Key of D) appearing on the lines and spaces of the key signature.

CHORD REGION

An additional region, that is, a chord indicating index or region 110, has been added in this form of the invention. It should be understood, however, that a chord region could be added to either of the foregoing embodiments also. In the chord indicating region 110 the first information sheet 100 is provided with slots or windows 112 and chord indicating indicia 114 aligned with the windows. The chord information chosen to be displayed has been an arbitrary selection and more or less could be provided for. The information selected though is the most commonly used, such as the tonic (I), the subdominant (IV) and the dominant seventh ($V^7$). Also the root, third, fifth and seventh notes are indicated. The tone indicia 112a is, of course, presented on the second information sheet 106 and is displayed in the windows 112.

MODIFIED FINGERBOARD REGIONS

In FIG. 8 a modified form of fingerboard region 120 is shown. It has been shown separately to indicate that the techniques used in this form are independently applicable to a separate chart and with some modification are applicable to the fingerboard regions of the outer modified forms discussed. Preferably this form of fingerboard region is to be used with the modification shown in FIG. 6 and the information indicia is presented in a manner most complementary to that modification. This modification is basically similar to the fingerboard region 20 shown in FIGS. 1–4 and 10, with the exception that less Keys are provided for and the adjustable nut shown particularly in FIGS. 1 and 10 is thus not necessary. Briefly the first information sheet 91 (reference characters identical with those of FIG. 6 are used where applicable) is provided with a fingerboard framing opening 121, a nut indicating bar 122 and string indicating lines 123. The string indicating lines are colored on either side as is indicated by the dotted boundary lines 124 and by the indicated colors. A second information slide sheet 96 is provided with window forming portions 127 and with string indicating lines 123a. The second information slide sheet is also provided with tonic indicators 125. A third information sheet 97 also includes window forming portions 126, tone indicia 121a and string indicating lines 123b. A fourth information slide sheet 98 is provided with rows of fingering indicia 121b.

The fingering indicia 121b and the tone indicia 121a are similarly colored corresponding to the string with which they are registered. The fingerboard region as shown in FIG. 8 is positioned for the Key of C, Fifth Position. Thus the information appearing is identical to that shown in FIG. 1 with the exception that the enharmonic E sharp shown in FIG. 1 is now indicated as tone F. In other words, the use of the enharmonics has been eliminated in the embodiment shown in FIG. 8.

FIG. 9 shows a further modification of a fingerboard region 130. This fingerboard region is intended to be used with the graphic notation region 100 of the basic chart shown in FIG. 7. It is described separately, however, for the purpose of showing that the fingerboard region may be used as a separate chart and with some alteration with the various regions of the other charts shown in FIGS. 1–4 and 10 and FIG. 6. The first information sheet 100 (like reference numerals being used corresponding to those shown in the chart in FIG. 7 where applicable) includes a fingerboard framing opening 132, an indicating nut 133 along one edge thereof, and string indicating lines 134. The color zones surrounding the strings are shaded by the dotted lines 135 with the colors indicated. The second information sheet 106 includes window forming portions 136, tonic indicators 138 and string indicating continuation lines 134a. The third information sheet 108 includes combined fingering and tone indicia 132a displayed in the window forming portions. String indicating continuation lines 134b are also provided. The fingering and tone indicia are surrounded by a color corresponding to the string with which they are aligned, as in the other embodiments. The chart shown in FIG. 9 is also set for the Key of C and of course is in a single Position, that of the First Position. The tone indicia thus displayed are identical to that shown in FIGS. 1 and 8, with the exception of the enharmonics in FIG. 1; however, the fingering is that of the First Position rather than the Fifth Position as in the other embodiments. Thus, the fingering for the Key of C, First Position to produce the tones indicated in for example, on the E string the first finger for F, the second finger for G, the third finger for A, and the fourth finger for B.

One further principle in the various charts shown is the variation of the "programming" employed. As is apparent from FIG. 2, the chart shown in FIGS. 1–5 and 10 is programmed with Keys related by Chromatic half-steps and Diminished Fifths, that is, C flat to C and C to G flat, respectively. The charts shown in FIGS. 6–9 are programmed in Perfect Fifths, that is, E flat to B flat, to F, to C, to G, and to D. The programming, of course, may vary further but has been limited herein solely for convenience. For example, instruments tuned in Perfect Fourths will use charts programmed D to G, to C, to F, to B flat, to E flat, etc.

While several variations have been shown primarily directed to basic, intermediate and more advanced and complete forms of the device, it should be understood that the principles employed in arranging and displaying the information are somewhat interchangeable between the various embodiments and are applicable to other teaching devices where tone notation and/or fingering must be learned. It should also be understood that the techniques employed for the separate regions of each composite chart may be varied still further in their presentation of the information displayed without departing from the principles of the invention. It should be recognized, therefore, that the invention is not limited to the forms described but is to be limited only by the scope of the claims appended hereto.

What is claimed is:

1. A music teaching device, comprising a first sheet having a fingering indicating region and a notation indicating region thereon, said fingering region having a simulated finger board of a stringed musical instrument including a graphical representation of a nut and a plurality of strings and having windows formed adjacent such strings in note fingering positions, said notation region having a graphical representation of a musical staff and having windows formed in note indicating positions on said staff, and a second sheet underlying such first sheet for relative sliding motion, having a fingering area and a notation indicating area generally viewable through said fingering region windows and said notation indicating region windows respectively, selected portions of said fingering area being colored, said colored portions being located such that when viewed through said fingering region windows each string is uniquely related to a particular color, selected portions of said notation indicating area being colored the same colors as the fingering area, said notation indicating colored portions being located such that when viewed through said notation indicating area windows said colors indicate which strings are to be fretted for each note on said staff.

2. A music teaching device as in claim 1, wherein said first sheet has a position indicating window adjacent said fingering region and a position indicating window adjacent said notation indicating region and said second sheet has position indicating indicia cooperating with said position indicating windows for indicating a plurality of settings of said second sheet relative to said first sheet, said positions corresponding to the fingering positions of the hand on a fingerboard, said second sheet further having fingering indicia printed in said fingering area and said notation indicating area such that for each of said settings and fingering indicia is viewable through said windows to indicate which finger is to be used to fret each string for the corresponding note shown in said notation indicating region.

3. The music teaching aid as in claim 2, wherein said first sheet has note name indicia appearing adjacent each window of said notation indicating region, and a third sheet is positioned between said first and said second sheets, said third sheet having a plurality of windows through which said notation indicating area is viewable and a plurality of windows through which said fingering position area is viewable, said first plurality of windows having note name indicia appearing adjacent thereto for viewing through said first sheet fingering region windows.

4. The music teaching device of claim 3, wherein notation indicia in said notation region indicate the natural and altered notes of a given key.

5. The music teaching device of claim 2, wherein notation indicia in said notation region indicate the natural and altered notes of a given key.

* * * * *

UNITED STATES PATENT OFFICE
CERTIFICATE OF CORRECTION

Patent No. 3,771,409            Dated November 13, 1973

Inventor(s) JAMES C. RICKEY

It is certified that error appears in the above-identified patent and that said Letters Patent are hereby corrected as shown below:

On the cover sheet insert -- The portion of the term of this patent subsequent to Jan. 12, 1988, has been disclaimed. -- .

Signed and sealed this 21st day of January 1975.

(SEAL)
Attest:

McCOY M. GIBSON JR.
Attesting Officer

C. MARSHALL DANN
Commissioner of Patents